May 29, 1956  J. W. LIGHT  2,747,713
COMPOSITION OF MATERIAL SUITABLE FOR USE IN A COUPLING
Filed Oct. 15, 1952
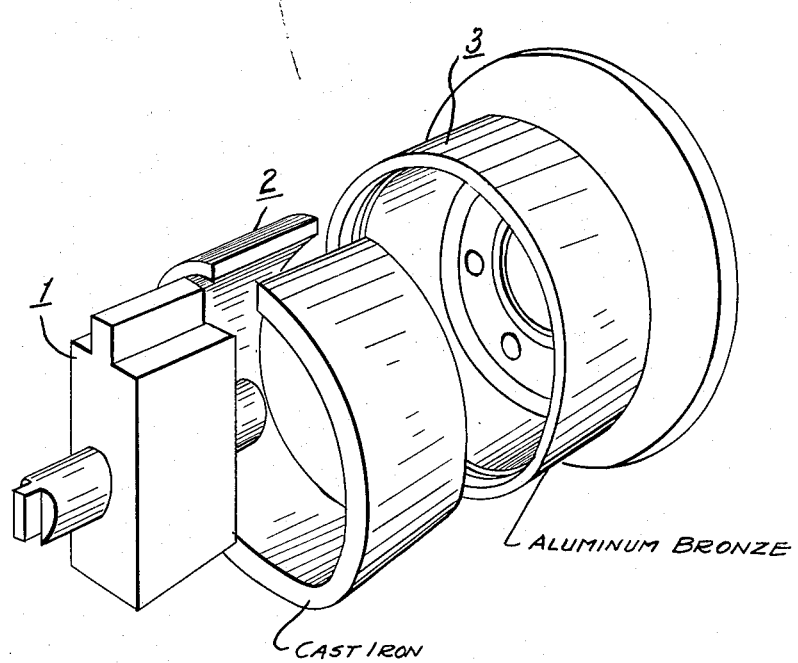
INVENTOR.
JAMES W. LIGHT
BY
ATTORNEYS

United States Patent Office 2,747,713
Patented May 29, 1956

2,747,713

COMPOSITION OF MATERIAL SUITABLE FOR USE IN A COUPLING

James W. Light, Greenville, Ohio, assignor to General Motors Corporation, Detroit, Mich., a corporation of Delaware Application October 15, 1952, Serial No. 314,887

6 Claims. (Cl. 192—107)

The present invention relates to couplings, and more particularly to the composition of members employed in friction couplings having torque limiting characteristics.

In power transmission devices it is often times necessary to employ a coupling, such as a clutch, having predetermined torque limiting characteristics. The primary reason for devices of this character is to protect the motivating apparatus, such as an electric motor. The clutch may be of the centrifugally actuated type to further reduce the starting load on the motivating apparatus. When used in this capacity, the friction coupling or clutch should possess a rather high thermal capacity to preclude the possibility of burning out under continuous slipping overloaded operation. Accordingly, one of my objects is to provide a composition for a coupling having driving and driven members characterized by having a high thermal capacity.

The aforementioned and other objects are accomplished in the present invention by providing driving and driven coupling members of different metallic compositions. Specifically, the coupling herein disclosed is a centrifugally actuated clutch constructed and arranged to have predetermined pick-up and slip characteristics. The composition of the driving and driven members is important if durability and high load capacity operation is desired. Accordingly, the driving member is composed of cast iron preferably having a pearlitic matrix with a minimum of ferrite. The driven member is composed of aluminum bronze. Exhaustive experimental testing has indicated that members of the aforegoing compositions when used together achieve the desired results.

Further objects and advantages of the present invention will be apparent from the following description, reference being had to the accompanying drawing which shows a view in exploded perspective of a coupling constructed according to this invention.

The present invention is exemplified in conjunction with a centrifugally loaded friction coupling. However, it is to be understood that this is merely by way of example, as the metallic composition of the driving and driven members may be successfully utilized in couplings of different character, such as disclosed and claimed in my copending application, Serial No. 314,888, filed of even date herewith.

With particular reference to the drawing, a coupling is shown constituted by three parts, namely: a driving tang 1, a split sleeve 2, and a housing assembly 3. The structural features of the coupling and its operation are described and claimed in my copending application, Serial No. 314,886, filed of even date herewith, and, accordingly, will only be dealt with herein insofar as is deemed sufficient to constitute the environment of this invention.

When the component parts of the coupling heretofore mentioned are assembled, the split ring 2 is coaxially arranged within the cylindrical portion of the housing assembly 3, the dimensional relationship between the sleeve and housing being such that the members are not in frictional engagement under static conditions. In the coupling the split sleeve 2, constitutes the driving member, while the housing assembly 3 constitutes the driven member. Rotation is transmitted to the driving member 2 by means of the tang 1, one end of which is rotatably journaled in suitable bearing means supported by the housing assembly 3. The other end of the driving tang 1 is connected to a suitable source of power, such as an electric motor, not shown. The stepped end portion of the tang member is situated between the end surfaces of the split ring 2 when the coupling is assembled and upon the split sleeve 2, and upon tang 1 attaining a predetermined angular velocity, attendant centrifugal force will be sufficient to expand the sleeve 2 to an extent where it frictionally engages a cylindrical portion of the housing assembly 3. When the driving member 2 has attained this predetermined angular velocity, a non-slipping, driving connection between the driving and driven members of the coupling will exist so long as the load imposed on the driven member 3 thereof does not exceed a predetermined value.

The driven member 3 is connected by any suitable means to a load device, not shown, as will be readily apparent to a reference to the aforementioned second copending application. Upon the imposition of an overload on the driven member of the coupling, slippage will ensue between the driving and driven members of the coupling. Thus, the coupling constitutes a torque limiting device, the particular torque which the coupling will transmit being determined by the construction and arrangement of the coupling.

The composition of materials hereinafter disclosed, which constitute the driving and driven members of the coupling, are such as to produce a coupling of high thermal capacity. That is, the coupling may be subjected to continuous slipping under the imposition of an overload without any harm ensuing to the coupling members. Thus, the coupling may be used as a protective device whereby an overload will not be imposed upon the driving motor, not shown, by the load device, not shown.

Exhaustive experimental tests have indicated that the desired results are achieved by using driving and driven members of different metallic compositions. The driving member or split ring is preferably composed of an alloy cast iron having a chemical composition shown in Table I.

*Table I*

| Element | Per cent |
|---|---|
| Iron | 92.73 min. |
| Total carbon | 3.10–3.40 |
| Silicon | 2.15–2.35 |
| Chromium | 0.15–0.25 |
| Manganese | 0.55–0.75 |
| Phosphorus | 0.20 max. |
| Sulfur | 0.17 max. |
| Nickel | 0.07–0.15 |

The driven member of the coupling, namely, the cylindrical portion of the housing assembly 3, is composed of an aluminum bronze alloy having a chemical composition according to Table II.

*Table II*

| Element: | Per cent |
|---|---|
| Copper | 84.5 min. |
| Aluminum | 9.0–11.0 |
| Iron | 2.0–4.0 |
| Manganese | 0.30 max. |
| Tin | 0.20 max. |

With regard to the composition of material in Table I, it is to be noted that the physical properties and quality requirements of the cast iron alloy take precedence over this composition. That is, the percentage of the various constituents may vary somewhat from that shown to assure that the cast iron has a tensile strength of between 35,000 and 45,000 p. s. i.; a Brinell hardness averaging 200; and a cast iron that is commercially machineable. Moreover, the matrix shall predominantly comprise pearlite, with the maximum permissible percentage of ferrite being 20%.

A coupling having driving and driven members composed of the alloy compositions heretofore disclosed, will have a remarkable high thermal capacity. Moreover, the coefficient of friction when the members are used as a frictional coupling will be ample under proper loading to enable a non-slipping friction drive between a motor and a load device.

While the embodiment of the present invention as herein disclosed, constitutes a preferred form, it is to be understood that other forms might be adopted.

What is claimed is as follows:

1. As a new article of manufacture, a friction coupling including, a driving member composed of cast iron having a matrix with a maximum of 20% ferrite, and a driven member composed of aluminum bronze having at least 84.5% copper.

2. As a new article of manufacture, a friction coupling including, a driving member composed of cast iron having a predominantly pearlitic matrix with a maximum of 20% ferrite, and a driven member composed of aluminum bronze having at least 84.5% copper.

3. As a new article of manufacture, a friction coupling including, a driving member composed of cast iron having a substantially pearlitic matrix, and a driven member composed of aluminum bronze having at least 84.5% copper.

4. As a new article of manufacture, a friction coupling including, a driving member composed of cast iron, and a driven member composed of aluminum bronze having a minimum of 84.5% copper and a minimum of 9% aluminum.

5. As a new article of manufacture, a friction coupling including, a driving member composed of cast iron, a driven member composed of aluminum bronze having a minimum of 84.5% copper, between 9% and 11% aluminum, and between 2% and 4% iron.

6. As a new article of manufacture, a friction coupling including, a driving member composed of cast iron, a driven member composed of aluminum bronze having a minimum of 84.5% copper, a maximum of 11% aluminum, a maximum of 4% iron, and a maximum of .20% tin.

References Cited in the file of this patent

UNITED STATES PATENTS

| | | |
|---|---|---|
| 1,625,777 | Kuchen | Apr. 19, 1927 |
| 1,820,711 | Sargent | Aug. 25, 1931 |
| 1,900,804 | Crowe | Mar. 7, 1933 |
| 1,902,576 | Norton | Mar. 21, 1933 |
| 2,089,080 | Valentine | Aug. 3, 1937 |
| 2,122,405 | Bockius et al. | July 5, 1938 |

FOREIGN PATENTS

| | | |
|---|---|---|
| 4,978 | Great Britain | Mar. 9, 1905 |